United States Patent
Segarra, Jr. et al.

(10) Patent No.: US 10,887,487 B2
(45) Date of Patent: Jan. 5, 2021

(54) IMAGE PROCESSING APPARATUS

(71) Applicant: KYOCERA Document Solutions Inc., Osaka (JP)

(72) Inventors: Nixon Segarra, Jr., Osaka (JP); Vinald Rey Cagatan, Osaka (JP); Irish Navarro, Osaka (JP); Jefty Negapatan, Osaka (JP); John Paul Dingle, Osaka (JP); Jay Pabalate, Osaka (JP); Jesus Jovannie John Burgos, Osaka (JP); Deniel Molina, Osaka (JP); Shiela Mae Quimbo, Osaka (JP); Rodney Omangayon, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/618,977

(22) PCT Filed: May 21, 2018

(86) PCT No.: PCT/JP2018/019495
§ 371 (c)(1),
(2) Date: Dec. 3, 2019

(87) PCT Pub. No.: WO2019/021600
PCT Pub. Date: Jan. 31, 2019

(65) Prior Publication Data
US 2020/0177762 A1    Jun. 4, 2020

(30) Foreign Application Priority Data

Jul. 24, 2017 (JP) ................................ 2017-142989

(51) Int. Cl.
*G06F 15/00* (2006.01)
*G06K 1/00* (2006.01)
(Continued)

(52) U.S. Cl.
CPC .......... *H04N 1/387* (2013.01); *G06K 9/2081* (2013.01); *H04N 1/0044* (2013.01); *H04N 1/00331* (2013.01); *H04N 2201/0094* (2013.01)

(58) Field of Classification Search
CPC .. H04N 1/387; H04N 1/00331; H04N 1/0044; G06K 9/2081
(Continued)

(56) References Cited

U.S. PATENT DOCUMENTS 6,310,971 B1 * 10/2001 Shiiyama .......... G06F 16/90344
382/181
6,434,270 B1 * 8/2002 Ohara ..................... G06K 9/346
382/178
(Continued)

FOREIGN PATENT DOCUMENTS

| JP | H06-52356 A | 2/1994 |
|---|---|---|
| JP | H07-95337 A | 4/1995 |
| JP | H11-98292 A | 4/1999 |

*Primary Examiner* — Douglas Q Tran
(74) *Attorney, Agent, or Firm* — IP Business Solutions, LLC

(57) ABSTRACT

An image forming apparatus includes: an image reading device that optically reads a document to obtain image data; a character recognizer that recognizes a character pattern included in the image data as a character; a character estimator that, for the character pattern that the character recognizer failed to recognize, from characters, which precede and follow the character pattern and have been recognized by the character recognizer, estimates, in accordance with a grammar rule, a character that the character pattern indicates; and an image data reconfigurer that arranges each character recognized by the character recognizer and each character estimated by the character estimator in an order (Continued)

same as an arrangement order of each character pattern included in the image data to generate reconfigured image data.

5 Claims, 13 Drawing Sheets

(51) Int. Cl.
   *G06K 15/02* (2006.01)
   *H04N 1/387* (2006.01)
   *G06K 9/20* (2006.01)
   *H04N 1/00* (2006.01)
(58) Field of Classification Search
   USPC .................................................. 358/1.11, 1.1
   See application file for complete search history.

(56) References Cited

U.S. PATENT DOCUMENTS

| | | | | |
|---|---|---|---|---|
| 2006/0104220 A1* | 5/2006 | Yamazaki | ............. | H04L 67/125 |
| | | | | 370/254 |
| 2014/0049554 A1* | 2/2014 | Chen | ...................... | G09G 5/377 |
| | | | | 345/589 |
| 2015/0302560 A1* | 10/2015 | Sumiyoshi | ......... | H04N 5/23229 |
| | | | | 382/203 |
| 2018/0183964 A1* | 6/2018 | Tamura | ............. | H04N 1/00514 |
| 2018/0205851 A1* | 7/2018 | Hattori | ............... | H04N 1/00469 |

* cited by examiner

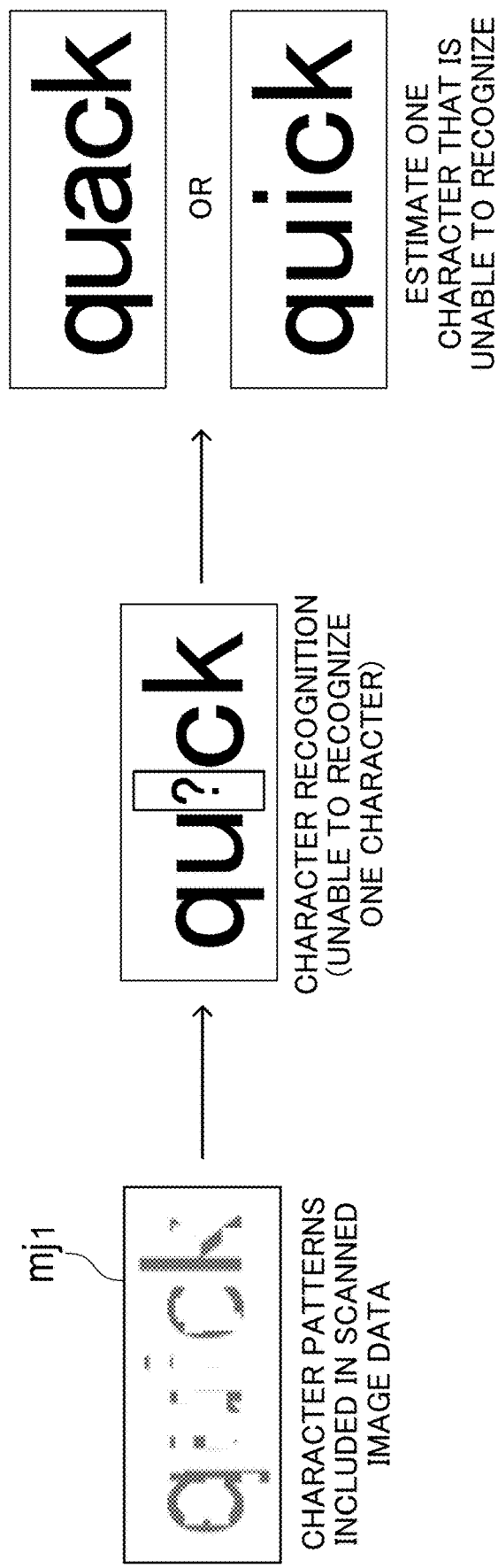

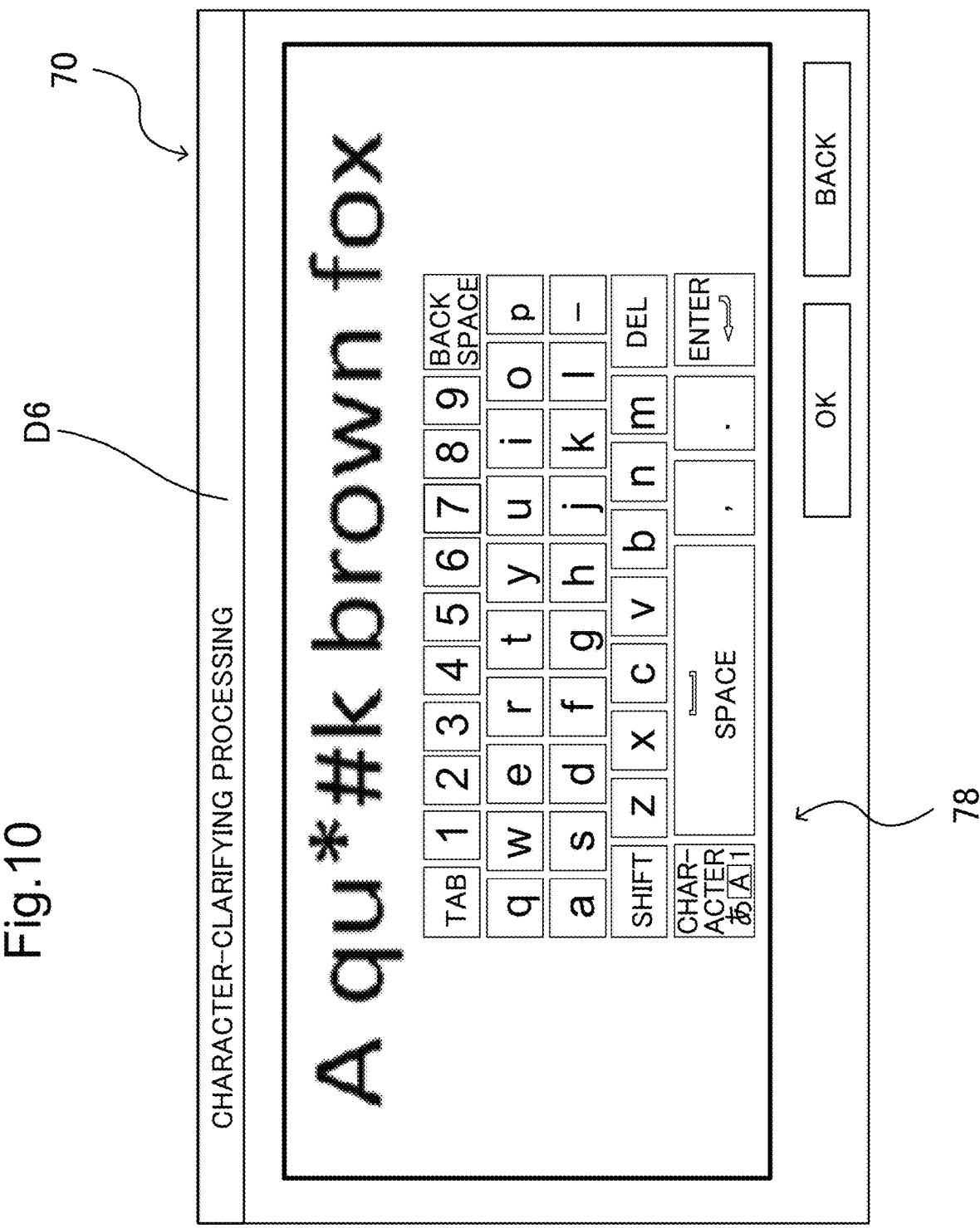

IMAGE PROCESSING APPARATUS

TECHNICAL FIELD

The present invention relates to image processing apparatuses and particularly relates to a technique for clarifying a character contained in a document image obtained by scanning a document on which unclear character is included.

BACKGROUND ART

Optical character recognition (OCR) technique, in which printed characters are optically read and converted into character codes, is known. In the OCR, if an image quality of a document is poor and a character to be read is faint or blurred, or a part of the character is missing, therein lies a problem that the characters cannot be recognized correctly. Patent Literature (PTL) 1 discloses the character pattern repairing method: there, as the character pattern repairing method repairing a blur on a character pattern on a document image and so on to thereby improve accuracy of character recognition, the end point at the tip of the character line is detected from the character pattern, the endpoint pair consisting of two endpoints caused by the blur is selected, and the selected endpoint pair is connected, to repair the blur of the character pattern.

CITATION LIST

Patent Literature

Patent Literature 1: JP-A-6-52356

SUMMARY OF INVENTION

In the case of the technique disclosed in PTL 1, when the character pattern shown by the scanned image is blurred, it is possible to repair the blur and improve the accuracy of character recognition. For example, in the technique disclosed in PTL 1, when a blur is caused due to the low density of the character pattern, the blur is repaired by increasing the scanning density and performing the scanning of the document by the document reading device to heighten the density of the characters contained in the document. However, if a part of the character contained in the document is missing, the blur cannot be repaired no matter how high the reading density is adjusted, so that it is still difficult to distinguish the characters. This make it difficult for the technique disclosed in PTL 1 to improve the accuracy of character recognition when the blur cannot be repaired and the accuracy of character recognition is reduced.

The present invention has been made in view of the above circumstances and, therefore, has an object of, even when it is impossible to repair a blur appeared on the character contained in a document image obtained by scanning a document on which an unclear character is included, clarifying a character contained in a document image.

An image processing apparatus according to an aspect of the present invention includes: an image reading device that optically reads a document to obtain image data; a character recognizer that recognizes a character pattern included in the image data as a character; a character estimator that, for the character pattern that the character recognizer failed to recognize, from characters, which precede and follow the character pattern and have been recognized by the character recognizer, estimates, in accordance with a grammar rule, a character that the character pattern indicates; and an image data reconfigurer that arranges each character recognized by the character recognizer and each character estimated by the character estimator in an order same as an arrangement order of each character pattern included in the image data to generate reconfigured image data.

According to the present invention, even when it is impossible to repair the blur appeared on the character contained in the document image obtained by scanning the document on which the unclear character is included, clarifying the character contained in the document image can be achieved.

BRIEF DESCRIPTION OF DRAWINGS

FIG. 3A is a diagram for explaining an example of character recognition and character estimation of unclear character patterns.

FIG. 10 is a diagram showing a display example of a screen during an editing of the reconfigured image data.

DESCRIPTION OF EMBODIMENTS

Figure 1:
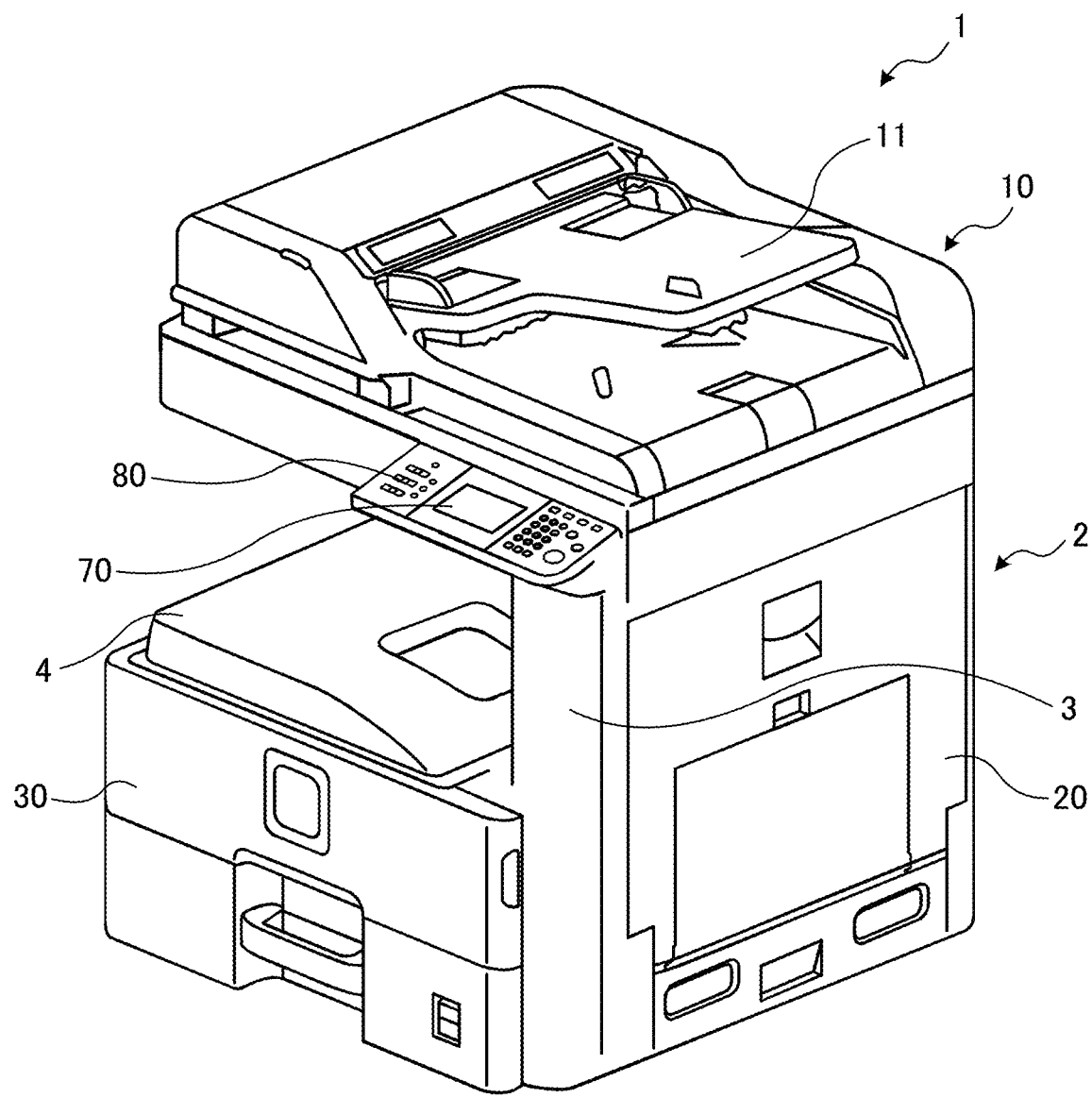
FIG. 1 is a perspective view showing an outer appearance of an image forming apparatus being as one example of an image processing apparatus according to one embodiment of the present invention.
Figure 2:
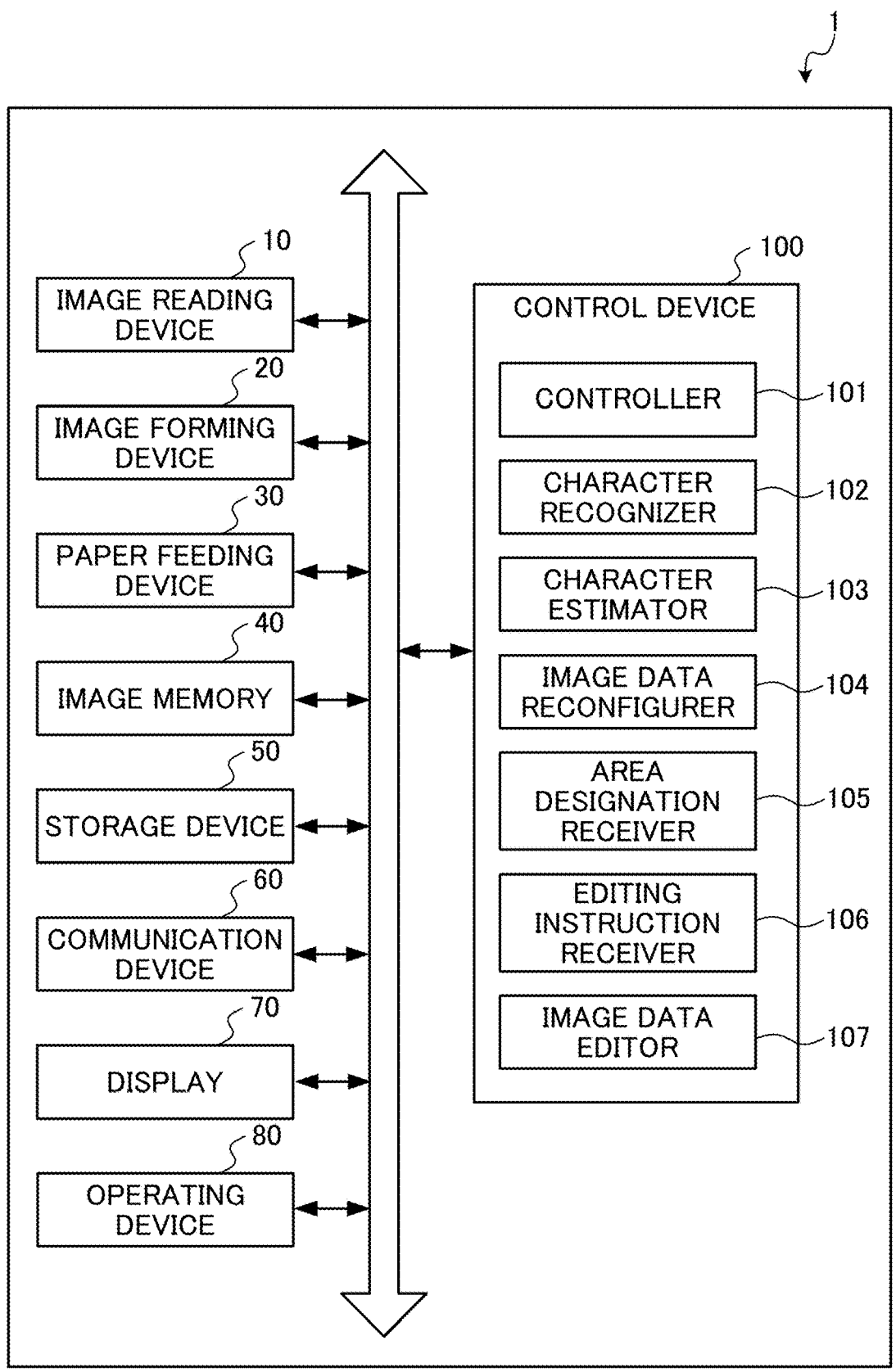
FIG. 2 is a block diagram showing an internal configuration of the image forming apparatus being as one example of the image processing apparatus according to one embodiment of the present invention.

Hereinafter, a description will be given of an image forming apparatus being as one example of an image processing apparatus according to one embodiment of the present invention, with reference to the drawings. FIG. 1 is a perspective view showing an outer appearance of an image forming apparatus 1. FIG. 2 is a block diagram showing an internal configuration of the image forming apparatus 1.

The image forming apparatus 1 is a multifunction peripheral having multiple functions, including a facsimile transmission function, a copy function, a print function, and a scan function. As shown in FIG. 1, the image forming apparatus 1 is roughly composed of an apparatus body 2, an image reading device 10 disposed above the apparatus body 2, and a connecting part 3 provided between the image reading device 10 and the apparatus body 2.

The image reading device 10 is an auto document feeder (ADF) including: a document carrying device 11; and a scanner that optically reads a document being carried by the document carrying device 11 or a document placed on an un-illustrated contact glass. By reading documents one by one, the image reading device 10 obtains image data to be stored or to be image formation target.

The apparatus body 2 includes an image forming device 20, a paper feeding device 30, an image memory 40, a storage device 50, a communication device 60, and so on.

The image memory 40 is a region for temporarily storing image data read by the image reading device 10.

The image forming device 20 reads out the image data stored in the image memory 40, uses the data, and forms (prints) an image on a paper sheet fed from the paper feeding device 30. A printed paper sheet is discharged to a discharge tray 4.

The storage device 50 is a large storage device such as a hard disk drive (HDD).

The communication device 60 is a communication interface including a communication module such as an un-illustrated LAN chip. The image forming apparatus 1 is connected to, for example, another personal computer (PC) via a network, and transmits and receives data to and from the PC connected through the communication device 60.

A display 70 and an operating device 80 are disposed at a front side of the apparatus body 2. The display 70 is formed to include a liquid crystal display (LCD) or an organic light-emitting diode (OLED) display. The display 70 displays, for example, an operation screen for instructing operation of the image forming apparatus 1.

The operating device 80 includes, for example, a start key for instructing execution of a print job, a determination key (enter key) for performing confirming operation on a graphical user interface (GUI) forming the operation screen, and keys for inputting numerical values. The operating device 80 receives, for example, operation on a screen displayed on the display 70 from a user.

The image forming apparatus 1 further includes a control device 100. The control device 100 includes a processor, a random access memory (RAM), a read only memory (ROM), a dedicated hardware circuit, and so on. The processor is, for example, a central processing unit (CPU), a micro-processing unit (MPU), or an application specific integrated circuit (ASIC). When a control program, such as a document reading processing program, stored in the ROM or the storage device 50, is executed by the processor, the control device 100 functions as a controller 101, a character recognizer 102, a character estimator 103, an image data reconfigurer 104, an area designation receiver 105, an editing instruction receiver 106, and an image data editor 107. Alternatively, each of the aforementioned components of the control device 100 may not be implemented in accordance with the aforesaid document reading processing program but may be constituted by a hardware circuit.

The controller 101 governs overall control of the image forming apparatus 1. The controller 101 is connected to the image reading device 10, the image forming device 20, the paper feeding device 30, the image memory 40, the storage device 50, the communication device 60, the display 70, the operating device 80, and so on. The controller 101 performs operation control of each of the mechanisms connected, and performs signal or data transmission and reception with each of the mechanisms.

With respect to the control of the display 70, for example, the controller 101 causes the display 70 to alternatively display the image data obtained by the image reading device 10 and reconfigured image data generated by the image data reconfigurer 104, in accordance with an instruction received through the operating device 80 by the user.

By use of the technique of optical character recognition (OCR), the character recognizer 102 recognizes an image representing each character included in the image data obtained by the image reading device 10, that is, recognizes a character pattern as a character. Characters that the character recognizer 102 recognizes are, for example, an English letter, a numeric character, a symbol, a kanji, a hiragana, and a katakana. Even if density of the character pattern is slightly low or the character pattern has a missing part (even if there is a blurry part), the character recognizer 102 recognizes a feature of the character pattern and recognizes the character pattern as a character.

However, if the density of the character pattern is extremely low or there are many missing (blurry) parts in the character pattern, there is a case where the character recognizer 102 cannot recognize the character that the character pattern indicates. With respect to the character pattern that the character recognizer 102 failed to recognize, from characters, which precede and follow the unrecognizable character pattern and have been recognized by the character recognizer 102, the character estimator 103 determines, in accordance with a grammar rule, a candidate for a character that the character pattern indicates. In other words, with respect to the character pattern unrecognizable, from the characters, which precede and follow the unrecognizable character pattern and have been recognized by the character recognizer 102, the character estimator 103 estimates the character that the character pattern indicates.

FIG. 3A is a diagram for explaining an example of character recognition and character estimation of unclear character patterns. For example, suppose that on image data obtained by scanning a document, a character pattern group mj1 is unclear, and that the character recognizer 102 is able to recognize characters "q", "u", "c", and "k" from the character pattern group mj1 but failed to recognize other characters (i.e., presence of the character patterns is recognized but not as far as characters). In such case, suppose that the characters "q" and "u" are being recognized at the preceding positions of the unknown character that the character recognizer 102 could not recognize and the characters "c" and "k" are being recognized at the following positions of the unknown character that the character recognizer 102 could not recognize, in accordance with a grammar rule, the character estimator 103 extracts English words "quick" and "quack" (English words having "q" and "u" as the top two characters and having "c" and "k" as the end two characters) as the characters that the character pattern group mj1 indicates, and determines that the candidates for the unknown characters are "i" and "a".

Figure 3B:
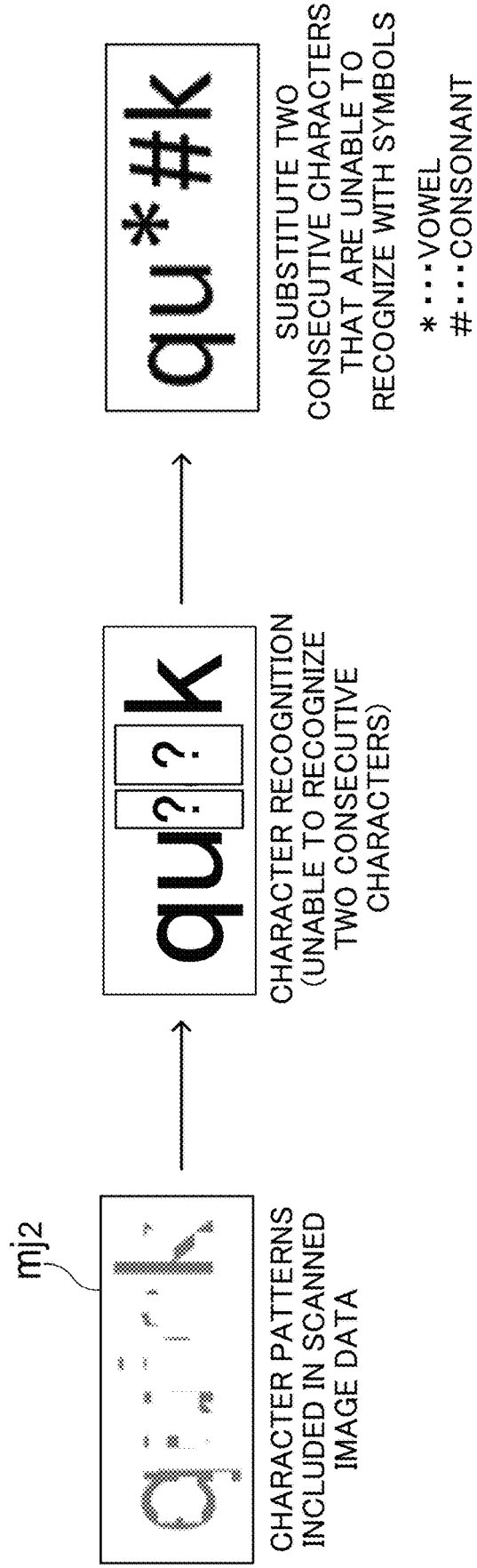
FIG. 3B is a diagram for explaining another example of the character recognition and the character estimation of the unclear character patterns.

When there are two or more consecutive character patterns that the character recognizer 102 fails to recognize, the character estimator 103 determines whether each of the character patterns is a vowel or a consonant, and uses different symbols for the vowel and the consonant to indicate each of the character patterns. FIG. 3B is a diagram for explaining the character recognition and the character estimation of the unclear character patterns in this case. For example, suppose that on image data obtained by scanning a document, a character pattern group mj2 is unclear, and that the character recognizer 102 is able to recognize, from the unclear character patterns, "q", "u", and "k" as characters but failed to recognize other character patterns as characters (i.e., presence of the character patterns is recognized but not as far as characters). In such case, since the characters "q" and "u" have been recognized at the preceding positions of the two unknown characters that the character recognizer 102 failed to recognize, and the character "k" has been recognized at the following position of the two unknown characters that the character recognizer 102 failed to recognize, in accordance with a grammar rule, the character estimator 103 extracts English words "quick" and "quack" (English words that satisfy the condition of having "q" and "u" at the proceeding positions of the unrecognized two unknown characters and "k" at the following position) and, from these words, further extracts "ic" and "ac" as the candidates for the two unknown characters failed to be recognized. The character estimator 103 then determines that "i" is a vowel and "c" is a consonant in "ic", and that "a" is a vowel and "c" is a consonant in "ac". The character estimator 103 then shows the vowel by the symbol "*" and the consonant by the symbol "#", respectively. Thereby, by the image data reconfigurer 104, the character pattern group mj2 is shown as "qu*#k". Here, the above determination of the vowel and consonant by the character estimator 103 is only an example.

The image data reconfigurer 104 arranges each of the characters recognized by the character recognizer 102 and each of the characters estimated by the character estimator 103 in an order same as an arrangement order of each of the character patterns included in the image data obtained by the image reading device 10 to generate the reconfigured image data. The image data reconfigurer 104 generates the reconfigured image data by, for example, both a character code and image data such as jpeg.

Figure 4A:
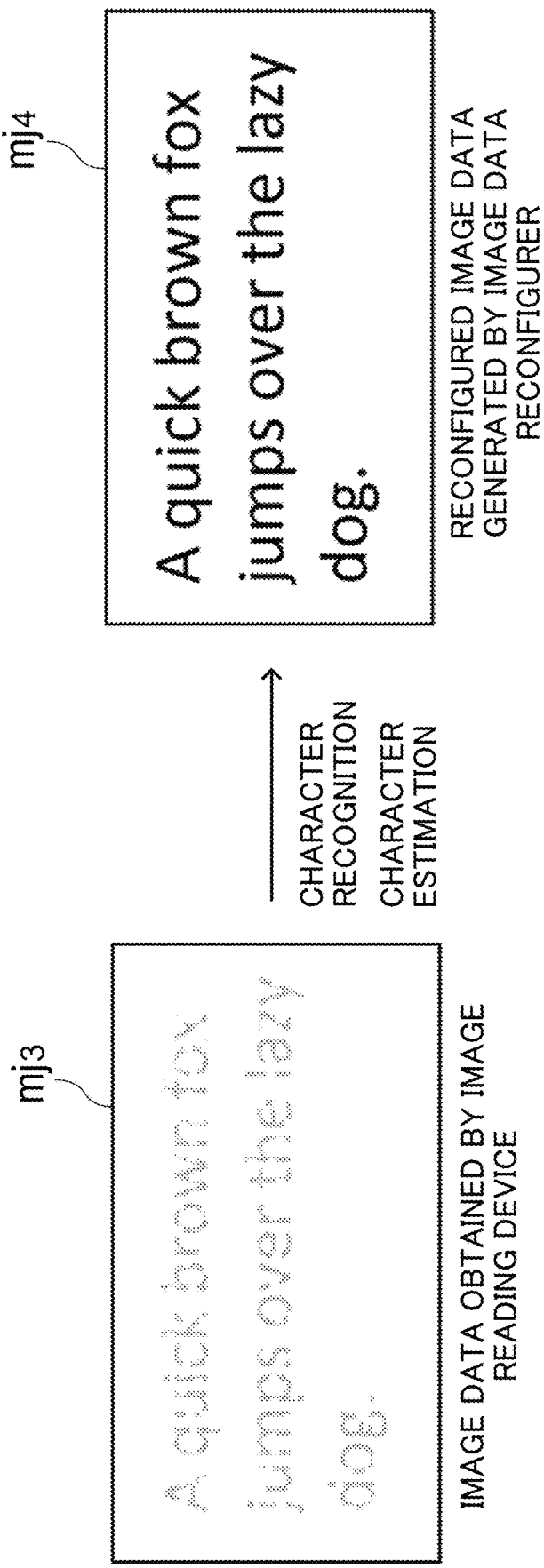
FIG. 4A is a diagram showing an example of image data obtained by an image reading device and reconfigured image data generated from whole image data.

FIG. 4A is a diagram showing an example of the image data obtained by the image reading device 10 and the reconfigured image data generated from the whole image data. Even when each of the character patterns in the image data obtained by the image reading device 10 is unclear as shown in FIG. 4A as a character pattern group mj3, when the character recognizer 102 and the character estimator 103 recognizes and estimates the character indicating each of the character patterns, the unclear image data is reconfigured into clarified reconfigured image data by the image data reconfigurer 104 (as shown as "reconfigured image data mj4" in FIG. 4A). The controller 101 causes the storage device 50 to store the reconfigured image data generated, and when necessary, reads out the reconfigured image data generated from the storage device 50 and causes the image forming device 20 to print.

When the image data obtained by the image reading device 10 is being displayed on the display 70, the area designation receiver 105 receives, from the user, an area designation instruction of designating an area in the image data to be a target of processing of the recognition, the estimation, and the generation of the reconfigured image data. When the area designation receiver 105 receives the area designation, for the designated area in the image data, the character recognizer 102 and the character estimator 103 perform the recognition and the estimation, and the image data reconfigurer 104, on the basis of the recognition and the estimation, generates the reconfigured image data. On the display 70, for example, a touch panel (functions as the operating device 80) is provided, and, at a portion where the image data obtained by the image reading device 10 is displayed (the portion being on a display screen of the display 70), when the user touches the display screen by his or her finger and slides the finger along with a straight line TS while keeping the finger in contact with the display screen, the touch panel transmits information indicating a locus of the slide gesture to the area designation receiver 105. Then, by the area designation receiver 105, an area R with the straight line TS as a diagonal line is received as the target area for the processing of the recognition, the estimation, and the generation of the reconfigured image data.

Figure 4B:
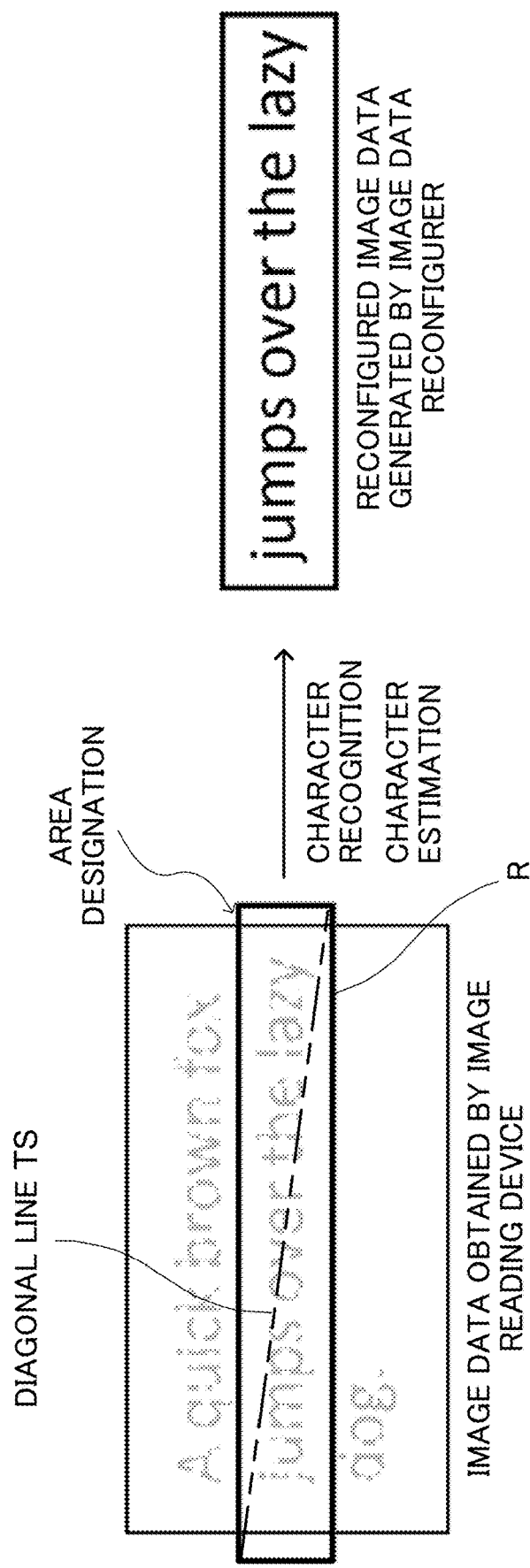
FIG. 4B is a diagram showing another example of the image data obtained by the image reading device and the reconfigured image data generated from a part of the image data.

FIG. 4B is a diagram showing an example of the image data obtained by the image reading device 10 and the reconfigured image data generated from a part of the image data. On the image data obtained by the image reading device 10, when the area is designated by the user as described above, the character recognizer 102 and the character estimator 103 perform the character recognition and the character estimation on each of the character patterns present within the designated area, and the image data reconfigurer 104 arranges the characters recognized and estimated by the character recognizer 102 and the character estimator 103 in order, to thereby generate the reconfigured image data configured by each of the character patterns present in the designated area.

When the reconfigured image data generated by the image data reconfigurer 104 is being displayed on the display 70, the editing instruction receiver 106 receives from the user an editing instruction for the reconfigured image data.

When the characters recognized by the character recognizer 102 and/or the characters estimated by the character estimator 103 are wrong, or when there are two or more consecutive character patterns that the character recognizer 102 failed to recognize and the characters estimated by the character estimator 103 are shown by the symbols, the user may want to correct the reconfigured image data. The editing instruction receiver 106 receives from the user the editing instruction for the reconfigured image data. To be specific, the controller 101 causes the display 70 to display the reconfigured image data to be edited, and a soft keyboard, and, based on touch operation by the user on a portion of the character patterns to be edited on the reconfigured image data, the editing instruction receiver 106 receives as the editing instruction, through the touch panel, an editing target designating instruction of designating the character patterns to be edited. Furthermore, based on touch operation by the user on the soft keyboard, the editing instruction receiver 106 receives as a further editing instruction, from the touch panel, a replacement character designating instruction of designating characters to be used in place of the character patterns to be edited.

In accordance with each of the editing instructions received by the editing instruction receiver 106, the image data editor 107 edits the reconfigured image data. For example, the image data editor 107 performs editing processing that replaces the character code corresponding to the character patterns indicated by the editing target designating instruction with the character code indicating the characters indicated by the replacement character designating instruction. The image data reconfigurer 104 generates the reconfigured image data by the content having gone through the editing processing performed by the image data editor 107. The image data reconfigurer 104 regenerates the image data in, for example jpeg, by the content having gone through the editing processing.

Figure 5A:
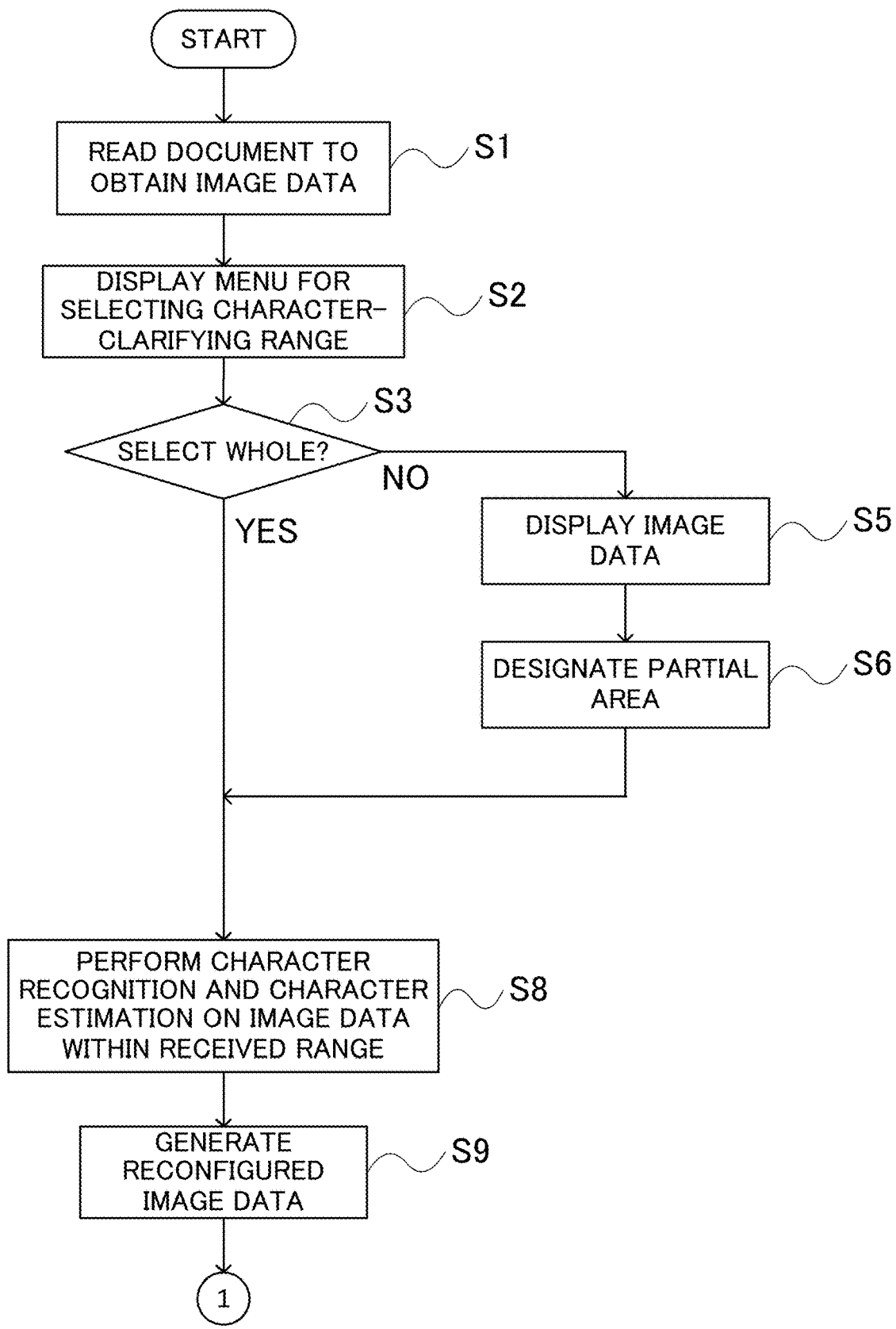
FIG. 5A is a flowchart showing a flow of character-clarifying processing for the image data performed by the image forming apparatus being as one example of the image processing apparatus according to one embodiment of the present invention.
Figure 5B:
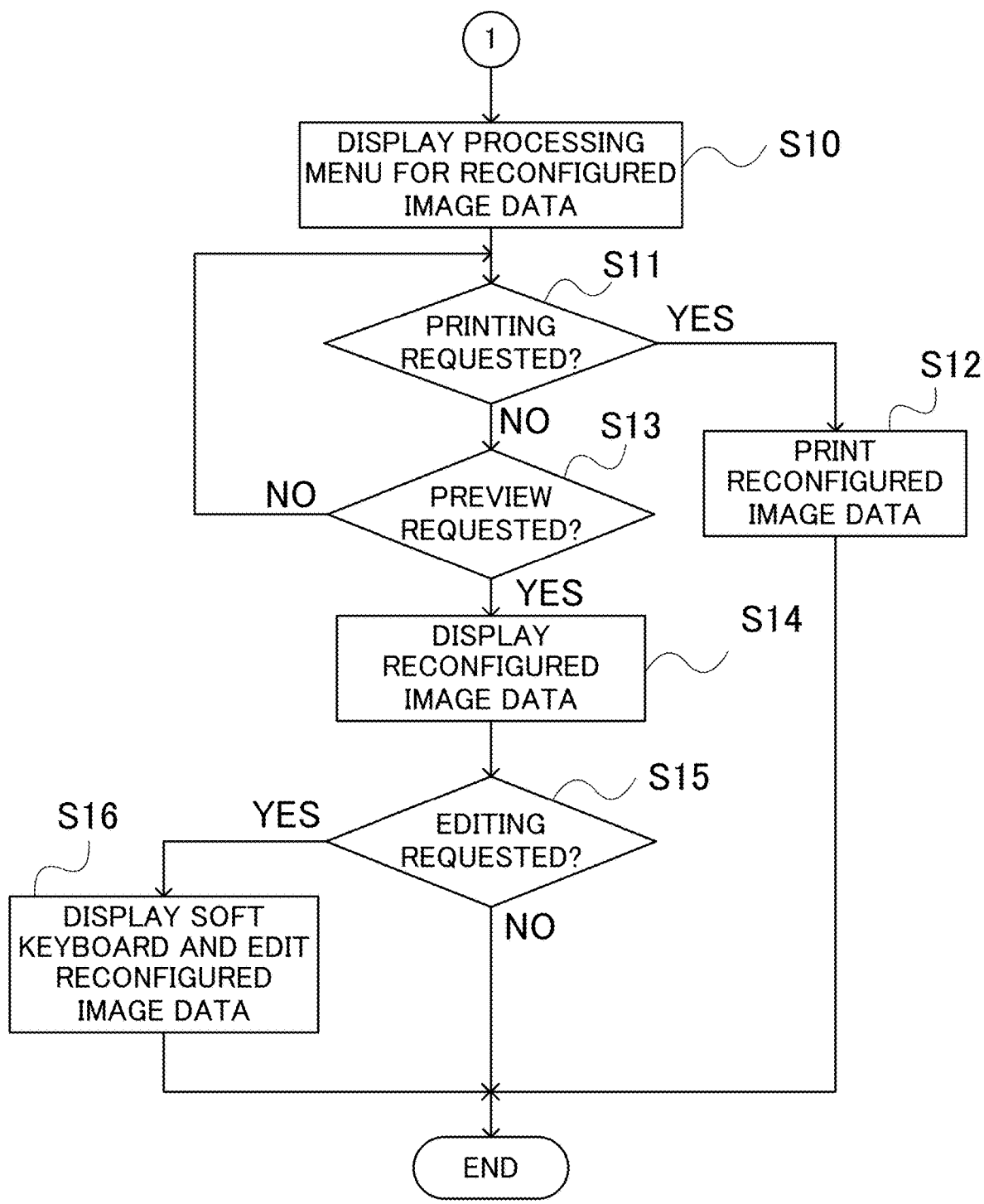
FIG. 5B is a flowchart following FIG. 5A.

Descriptions will be given to the processing of generating the reconfigured image data on which the characters have made clear from the image data obtained by the image reading device 10. FIG. 5A and FIG. 5B are flowcharts each showing a flow of character-clarifying processing for the image data performed by the image forming apparatus 1.

At first, the image reading device 10 optically reads a document to obtain image data (S1). Upon obtaining the imaged data of the document, the controller 101 cause the display 70 to display a selection menu screen D1 for receiving selection of a character-clarifying range of the image data (S2).

Figure 6:
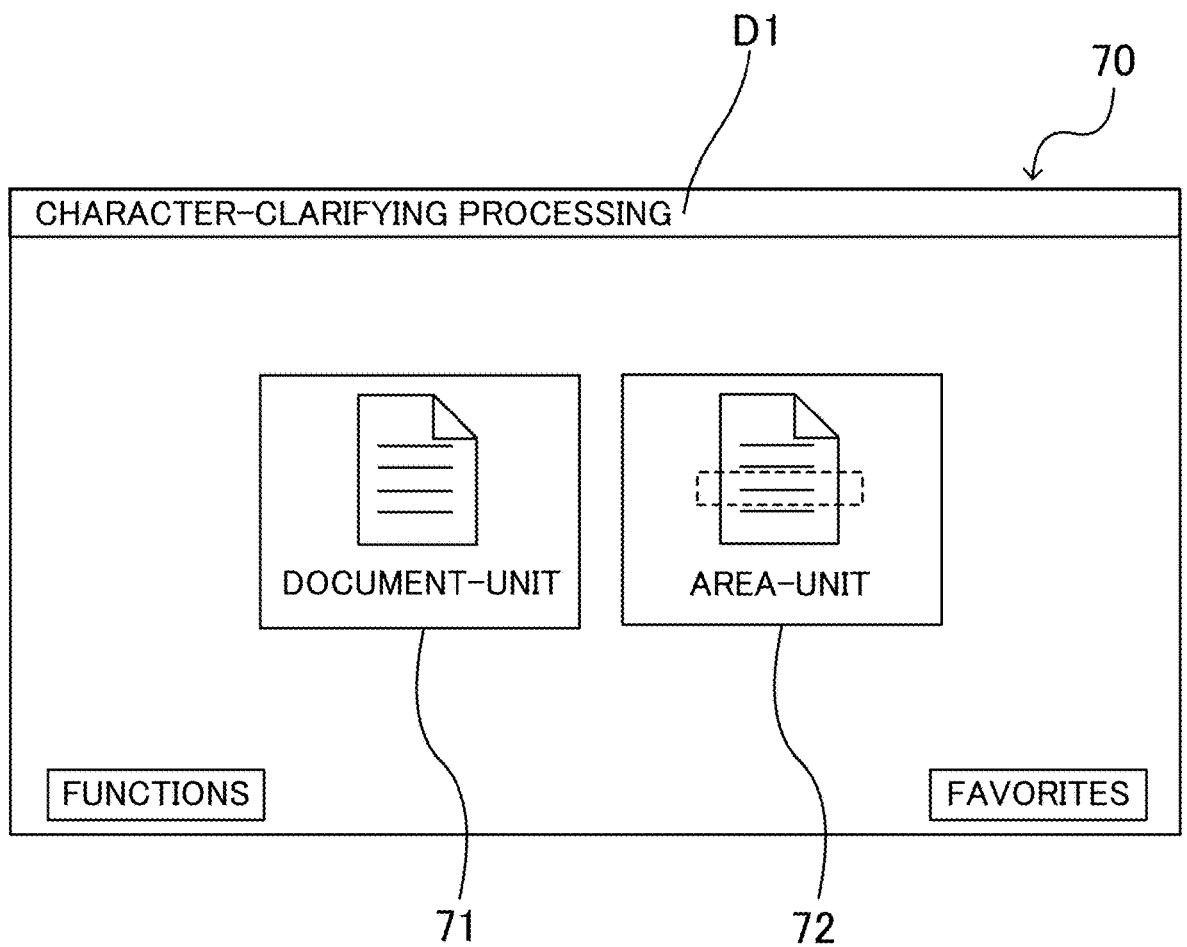
FIG. 6 is a diagram showing an example of a selection menu screen for selecting a character-clarifying range of the image data.

FIG. 6 is a diagram showing an example of the selection menu screen for selecting the character-clarifying range of the image data. As shown in FIG. 6 for example, on the selection menu screen D1, the controller 101 causes a document-unit button 71 and an area-unit button 72 to be displayed: the document-unit button 71 is for receiving an instruction of selecting the whole image data as the character-clarifying range, and the area-unit button 72 is for receiving an instruction of selecting a partial area in the document data as the character-clarifying range. When the user performs touch operation on the document-unit button 71, the instruction of selecting the whole image data as the character-clarifying range is received by the area designation receiver 105 through the touch panel. When the user performs touch operation on the area-unit button 72, the instruction of selecting the partial area in the document data as the character-clarifying range is received by the area designation receiver 105 through the touch panel.

At this point, when the instruction of selecting the whole image data as the character-clarifying range is received by the area designation receiver 105 (YES at S3), the whole image data becomes the target of the character clarification (target of the processing of the recognition, the estimation, and the generation of the reconfigured image data).

On the other hand, when the instruction of selecting the partial area in the document data as the character-clarifying range is received by the area designation receiver 105 (NO at S3), the controller 101 causes the display 70 to display a display screen D2 showing the image data obtained at S1 (S5). Under this state, through the touch panel, the area designation receiver 105 receives the area targeted for the processing of the recognition, the estimation, and the image data reconstitution, based on the slide gesture performed by the user on the display screen of the display 70 (S6).

Figure 7:
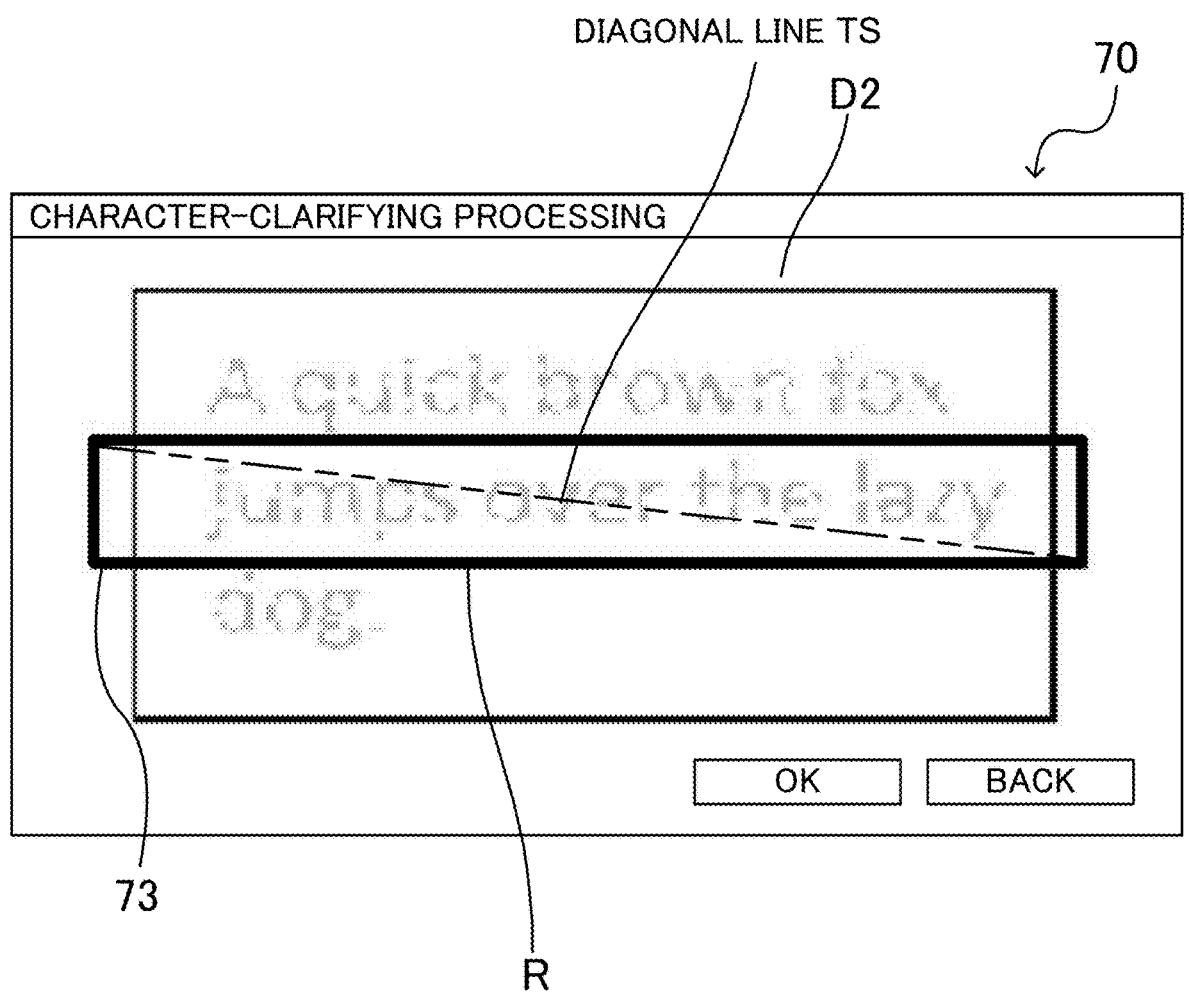
FIG. 7 is a diagram showing a screen display example during an area designation instruction of designating an area in the image data.

FIG. 7 is a diagram showing a screen display example during the area designation instruction of designating the area in the image data. As shown in FIG. 7 for example, under the state where the controller 101 is causing the display 70 to display the image data obtained at S1 when the user touches the display screen of the display 70 by his or her finger and slides the finger along with the straight line TS while keeping the finger in contact with the display screen, the touch panel transmits the information indicating the locus of the slide gesture to the area designation receiver 105, and by the area designation receiver 105, the area R with the straight line TS as the diagonal line is received as a character-clarifying range 73.

When the character-clarifying range of the image data obtained at S1 is received at S3 or at S6 with the manner described above, at the range received, the character recognizer 102 recognizes the character patterns within the image data as characters, and the character estimator 103 estimates the characters that the character patterns that the character recognizer 102 failed to recognize indicate (S8). Then, the image data reconfigurer 104 arranges each of the characters recognized by the character recognizer 102 and each of the characters estimated by the character estimator 103 in an order same as the order of each of the character patterns within the image data obtained by the image reading device 10, and generates the reconfigured image data (S9).

Figure 8:
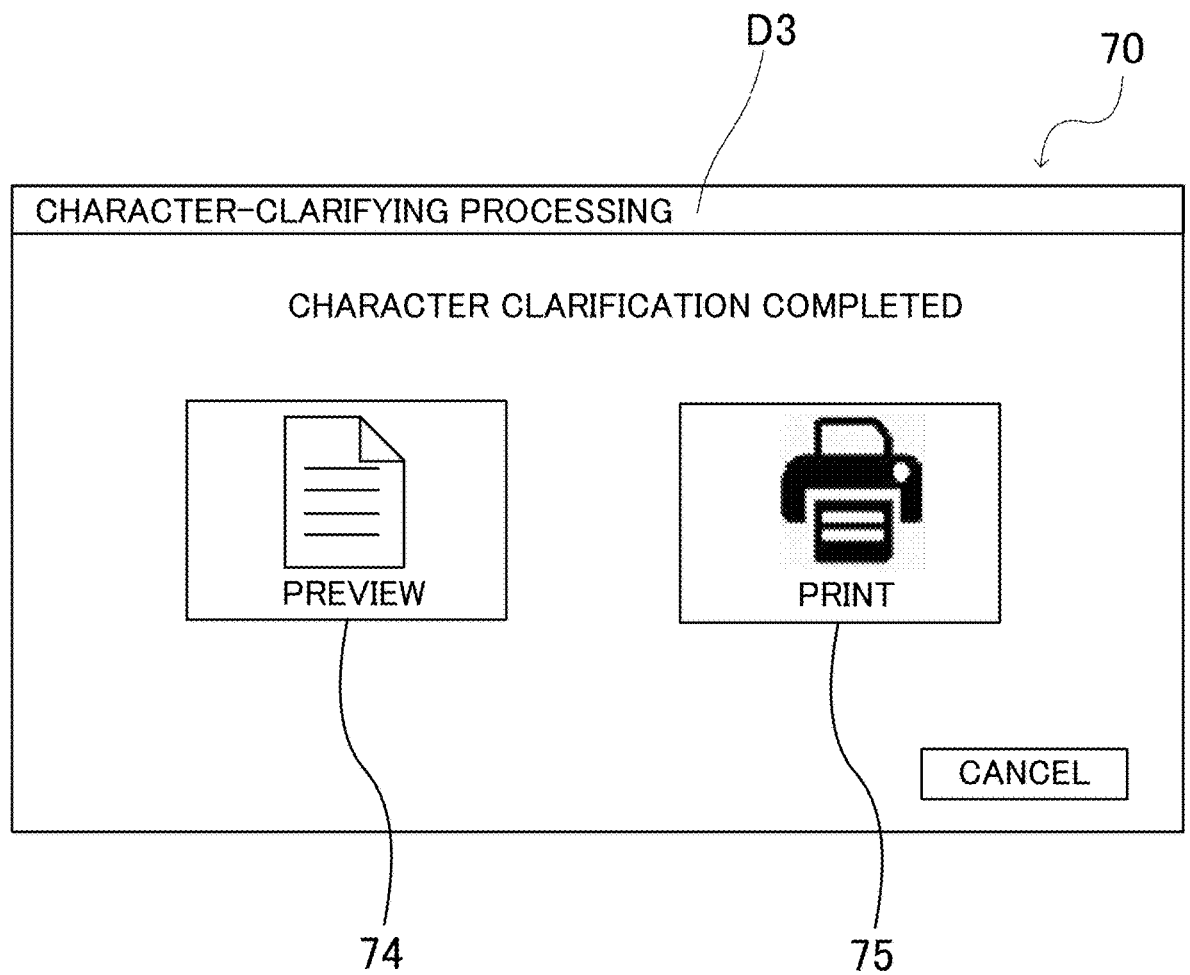
FIG. 8 is a diagram showing an example of a processing menu screen of the reconfigured image data.

When the reconfigured image data is generated as described above, the controller 101 causes the display 70 to display a processing menu screen D3 showing processing menu of the reconfigured image data (see FIG. 8) (S10). FIG. 8 is a diagram showing an example of the processing menu screen D3 of the reconfigured image data. As shown in FIG. 8 for example, the controller 101 causes the display 70 to display a preview button 74 and a print button 75: the preview button 74 is for receiving a preview instruction to preview the reconfigured image data, and the print button 75 is for receiving a printing instruction to print the reconfigured image data. Use can preview or print the reconfigured image data by touching the preview button 74 or the print button 75.

Through the operation performed by the user on the print button 75, when the printing instruction is received at the controller 101 through the touch panel (YES at S11), the controller 101 cause the image forming device 20 to print the reconfigured image data generated at S9 (S12). On the other hand, through the operation performed by the user on the preview button 74, when the preview instruction is received at the controller 101 through the touch panel (NO at S11, YES at S13), the controller 101 causes the display 70 to display the reconfigured image data generated at S9 (S14).

Figure 9:
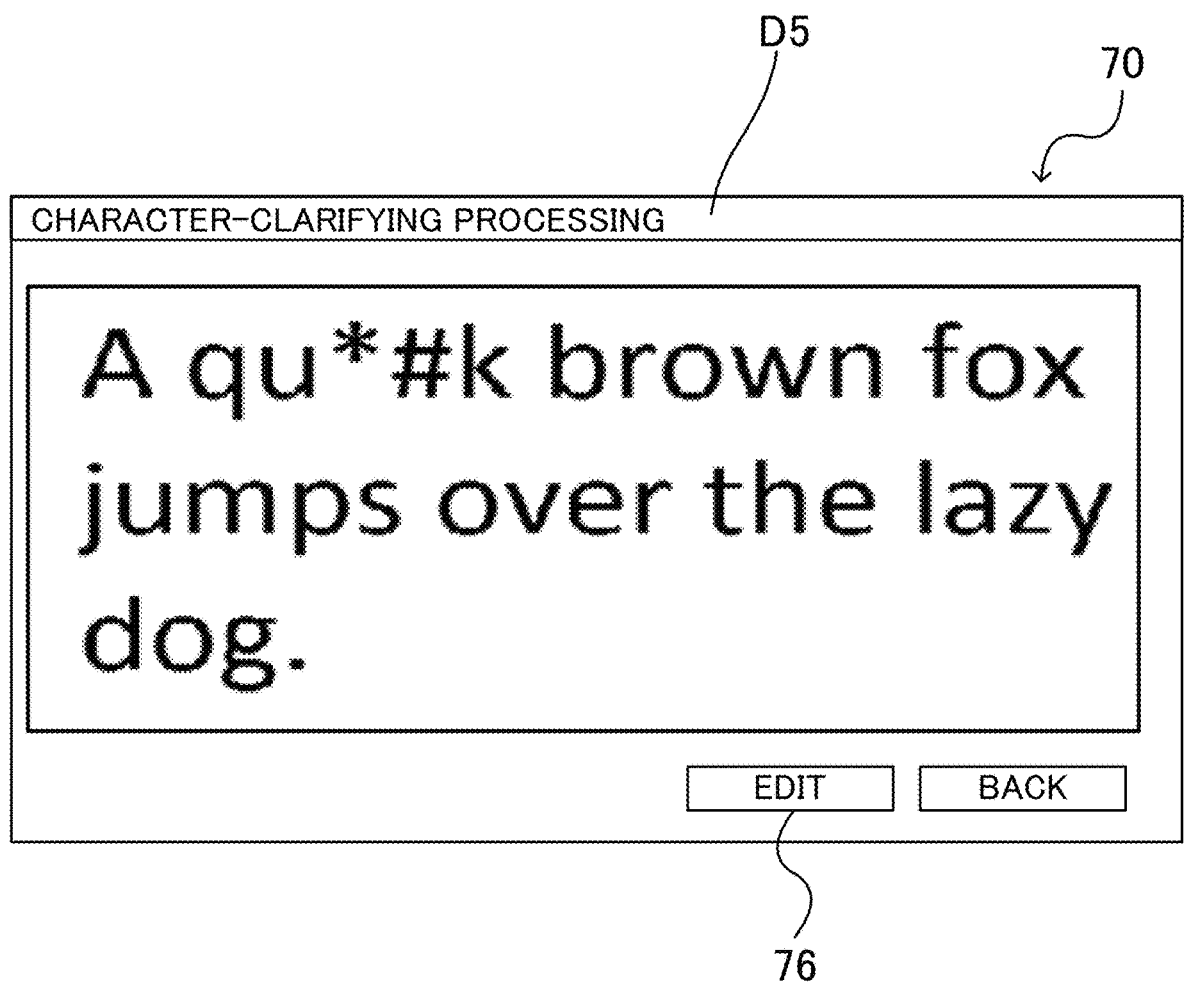
FIG. 9 is a diagram showing an example of a preview screen of the reconfigured image data.

FIG. 9 is a diagram showing an example of a preview screen D5 for the reconfigured image data. As shown in FIG. 9 for example, at the preview screen D5 for the reconfigured image data, the controller 101 causes an editing instruction button 76 for receiving the editing instruction of editing the reconfigured image data to be displayed. When the user performs touch operation on the editing instruction button 76, an instruction to start editing is received by the editing instruction receiver 106 through the touch panel.

Upon reception of the instruction to start editing the reconfigured image data with the manner described above (YES at S15), as an example is shown in FIG. 10, an editing instruction receiving screen D6 including a soft keyboard 78 is displayed on the display 70, and thereby the editing instruction receiver 106 is put into a possible state of receiving the instruction of editing the reconfigured image data. In this state, the image data editor 107 edits the reconfigured image data in accordance with the editing instruction received by the editing instruction receiver 106 (S16).

As described thus far, according to the present embodiment, in scanning the document including unclear characters, even when blurs appeared on the image of the scanned characters cannot be repaired, the aforesaid processing of the recognition, the estimation, and the generation of the reconfigured image data makes it possible to clarify the characters included in the document image obtained by the scanning. In addition, according to the present embodiment, the user is capable of freely select the character-clarifying range. Furthermore, the user can freely edit the reconfigured image data obtained by clarifying the characters.

OTHER VARIATIONS

Although in the above embodiment the image forming apparatus has been referred to as one example of the image processing apparatus, the present invention is not limited to this case. The image processing apparatus according to one embodiment of the present disclosure may be apparatuses other than the image forming apparatus, such as a scanner apparatus or a facsimile apparatus.

Furthermore, the document reading processing program described in the above embodiments may be that recorded on a non-transitory computer-readable recording medium, such as a hard disk, a CD-ROM, a DVD-ROM or a semiconductor memory. In this case, the non-transitory computer-readable recording medium with the document reading processing program recorded thereon is one embodiment of the present disclosure.

The invention claimed is:

1. An image processing apparatus comprising:
   an image reading device that optically reads a document to obtain image data;
   a display; and
   a control device that includes a processor and functions, through the processor executing a control program, as:
      a character recognizer that recognizes a character pattern included in the image data as a character;
      a character estimator that, for an unclear character pattern that the character recognizer failed to recognize as a character, from characters which precede and follow the unclear character pattern and have been recognized by the character recognizer, estimates, in accordance with a grammar rule, a character that the unclear character pattern indicates;
      an image data reconfigurer that arranges each character recognized by the character recognizer and each character estimated by the character estimator in an order same as an arrangement order of each character pattern and each unclear character pattern included in the image data to generate reconfigured image data; and
      a controller that causes the display to display the reconfigured image data;
   wherein when there are two or more consecutive unclear character patterns, the character estimator determines whether each of the unclear character patterns is a vowel or a consonant, indicate the unclear character pattern determined to be the vowel by using a first symbol which is not a letter, and indicate the unclear character pattern determined to be the consonant by using a second symbol which is different from the first symbol and not a letter, and
   the controller causes the display to display the reconfigured image data in which each of the unclear character patterns is indicated by the first symbol or the second symbol.

2. The image processing apparatus according to claim 1, wherein the control device further functions as:
   an editing instruction receiver that, when the reconfigured image data is being displayed on the display, receives from a user an editing instruction for the reconfigured image data; and
   an image data editor that edits the reconfigured image data in accordance with the editing instruction received by the editing instruction receiver.

3. The image processing apparatus according to claim 2, wherein
   the controller causes the display to alternatively display the image data and the reconfigured image data,
   the control device further functions as an area designation receiver that, when the image data is being displayed on the display, receives from the user an area designation instruction of designating the area in the image data to be the generation target of the reconfigured image data, and
   the image data reconfigurer generates the reconfigured image data for a partial area in the image data indicated by the area designation instruction received by the area designation receiver.

4. The image processing apparatus according to claim 3, wherein
   when the image reading device obtains the image data, the controller causes the display to display a screen for receiving selection of a character-clarifying range of the image data, and
   when the area designation receiver receives an instruction for selecting the partial area in the image data as the character-clarifying range, the controller causes the display to display the image data for a purpose of receiving the area designation instruction.

5. The image processing apparatus according to claim 4, wherein when the area designation receiver receives an instruction for selecting whole area in the image data as the character-clarifying range, the controller does not cause the display to display the image data for the purpose of receiving the area designation instruction.

* * * * *